US010632631B2

(12) United States Patent
Wagner et al.

(10) Patent No.: US 10,632,631 B2
(45) Date of Patent: *Apr. 28, 2020

(54) SYSTEMS AND METHODS FOR PROVIDING DYNAMIC COMMUNICATIVE LIGHTING IN A ROBOTIC ENVIRONMENT

(71) Applicant: Berkshire Grey, Inc., Lexington, MA (US)

(72) Inventors: Thomas Wagner, Concord, MA (US); Kevin Ahearn, Fort Mill, SC (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Somerville, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,753

(22) Filed: Jan. 9, 2019

(65) Prior Publication Data

US 2019/0143543 A1 May 16, 2019

Related U.S. Application Data

(63) Continuation of application No. 15/259,961, filed on Sep. 8, 2016, now Pat. No. 10,265,872, which is a
(Continued)

(51) Int. Cl.
*B25J 19/06* (2006.01)
*B25J 9/16* (2006.01)
*G08B 5/36* (2006.01)

(52) U.S. Cl.
CPC ............. *B25J 19/06* (2013.01); *B25J 9/1676* (2013.01); *G08B 5/36* (2013.01); *G05B 2219/40196* (2013.01); *G05B 2219/40202* (2013.01)

(58) Field of Classification Search
CPC ........ A61B 34/30; B23P 19/10; B25J 9/0003; B25J 9/1612; B25J 9/163; B25J 9/1671;
(Continued)

(56) References Cited

U.S. PATENT DOCUMENTS 4,412,775 A 11/1983 Molitor et al.
4,557,659 A 12/1985 Scaglia
(Continued)

FOREIGN PATENT DOCUMENTS

CH 701886 A2 3/2011
DE 102007038834 A1 2/2009
(Continued)

OTHER PUBLICATIONS

Liu et al., "Hand Arm Coordination for a Tomato Harvesting Robot Based on Commercial Manipulator", Proc. of the IEEE, Int'l Conf. on Robotics and Biometrics, Dec. 2013 (pp. 2715-2720).
(Continued)

*Primary Examiner* — Stephen R Burgdorf
(74) *Attorney, Agent, or Firm* — Gesmer Updegrove LLP

(57) ABSTRACT

A robotic system is disclosed that includes an articulated arm with an end effector. The robotic system is for use in a robotic environment requiring interaction with persons in the robotic environment, and includes a plurality of lights that are illuminated responsive to known near-future move-
(Continued)

ments of the articulated arm to convey the known near-future movements of the articulated arm to the persons in the robot environment.

17 Claims, 4 Drawing Sheets

Related U.S. Application Data continuation of application No. 62/216,017, filed on Sep. 9, 2015.

(58) Field of Classification Search
CPC ...... B25J 9/1676; B25J 9/1697; B25J 13/089; B25J 19/04; B25J 19/06; B65G 1/1373; F21V 21/14; G05B 2219/40196; G05B 2219/40202; G06F 3/041; G06N 3/008; G06Q 30/02; G06T 19/006; G08B 5/36; H05B 37/02; H05B 37/0227; H05B 37/0245
USPC ........................................................ 340/679
See application file for complete search history.

(56) References Cited

U.S. PATENT DOCUMENTS

| | | |
|---|---|---|
| 4,704,694 A | 11/1987 | Czerniejewski |
| 4,846,335 A | 7/1989 | Hartlepp |
| 4,896,357 A | 1/1990 | Hatano et al. |
| 5,794,789 A | 8/1998 | Payson et al. |
| 5,865,487 A | 2/1999 | Gore et al. |
| 6,079,570 A | 6/2000 | Oppliger et al. |
| 6,865,487 B2 | 3/2005 | Charron |
| 7,313,464 B1 | 12/2007 | Perreault et al. |
| 7,474,939 B2 | 1/2009 | Oda et al. |
| 7,516,848 B1 | 4/2009 | Shakes et al. |
| 7,677,622 B2 | 3/2010 | Dunkmann et al. |
| 7,861,844 B2 | 1/2011 | Hayduchok et al. |
| 8,718,814 B1 | 5/2014 | Clark et al. |
| 8,874,270 B2 | 10/2014 | Ando |
| 8,952,284 B1 | 2/2015 | Wong et al. |
| 9,061,868 B1 | 6/2015 | Paulsen et al. |
| 9,120,622 B1 | 9/2015 | Elazary et al. |
| 9,227,323 B1 | 1/2016 | Konolige et al. |
| 9,259,844 B2 | 2/2016 | Xu et al. |
| 9,492,923 B2 | 11/2016 | Wellman et al. |
| 9,604,363 B2 | 3/2017 | Ban |
| 2001/0045755 A1 | 11/2001 | Schick et al. |
| 2001/0056316 A1 | 12/2001 | Johnson et al. |
| 2003/0135300 A1 | 7/2003 | Lewis |
| 2006/0177295 A1* | 8/2006 | Frueh .................. B25J 9/046 414/695.8 |
| 2006/0242785 A1 | 11/2006 | Cawley et al. |
| 2007/0005179 A1 | 1/2007 | McCrackin et al. |
| 2008/0179224 A1 | 7/2008 | Van Bossuyt |
| 2008/0181485 A1 | 7/2008 | Beis et al. |
| 2009/0019818 A1 | 1/2009 | Gilmore et al. |
| 2010/0125361 A1 | 5/2010 | Mougin et al. |
| 2010/0180711 A1 | 7/2010 | Kilibarda et al. |
| 2010/0234857 A1 | 9/2010 | Itkowitz et al. |
| 2011/0144798 A1 | 6/2011 | Freudelsperger |
| 2011/0176148 A1 | 7/2011 | Briggs et al. |
| 2011/0184555 A1 | 7/2011 | Kosuge et al. |
| 2011/0320036 A1 | 12/2011 | Freudelsperger |
| 2012/0215346 A1 | 8/2012 | Gingher et al. |
| 2013/0232918 A1 | 9/2013 | Lomerson, Jr. |
| 2013/0245824 A1 | 9/2013 | Barajas et al. |
| 2013/0343640 A1 | 12/2013 | Buehler et al. |
| 2014/0005831 A1 | 1/2014 | Naderer et al. |
| 2014/0067121 A1 | 3/2014 | Brooks et al. |
| 2014/0067127 A1 | 3/2014 | Gotou |
| 2014/0195979 A1 | 7/2014 | Branton et al. |
| 2014/0291112 A1 | 10/2014 | Lyon et al. |
| 2014/0305847 A1 | 10/2014 | Kudrus |
| 2015/0057793 A1 | 2/2015 | Kawano |
| 2015/0073589 A1 | 3/2015 | Khodl et al. |
| 2015/0081090 A1 | 3/2015 | Dong |
| 2015/0217937 A1 | 8/2015 | Marquez |
| 2015/0224650 A1 | 8/2015 | Xu et al. |
| 2015/0369618 A1 | 12/2015 | Barnard et al. |
| 2015/0375401 A1 | 12/2015 | Dunkmann et al. |
| 2016/0027093 A1 | 1/2016 | Crebier |
| 2016/0136816 A1 | 5/2016 | Pistorino |
| 2016/0199884 A1 | 7/2016 | Lykkegaard et al. |
| 2016/0243704 A1 | 8/2016 | Vakanski et al. |
| 2016/0244262 A1 | 8/2016 | O'Brien et al. |
| 2017/0043953 A1 | 2/2017 | Battles et al. |
| 2017/0050315 A1 | 2/2017 | Henry et al. |
| 2017/0066597 A1 | 3/2017 | Hiroi |
| 2017/0080566 A1 | 3/2017 | Stubbs et al. |
| 2017/0106532 A1 | 4/2017 | Wellman et al. |

FOREIGN PATENT DOCUMENTS

| | | |
|---|---|---|
| EP | 0613841 A1 | 9/1994 |
| EP | 1256421 B1 | 1/2008 |
| EP | 1995192 A2 | 11/2008 |
| EP | 2960024 A2 | 12/2015 |
| EP | 3006379 A2 | 4/2016 |
| WO | 2010034044 A2 | 4/2010 |
| WO | 2010099873 A1 | 9/2010 |
| WO | 2014111483 A1 | 7/2014 |
| WO | 2015162390 A1 | 10/2015 |

OTHER PUBLICATIONS

Vitton et al., "A Flexible Robotic Gripper for Automation of Assembly Tasks", Proc. of the ASME—Dynamic Systems & Control Div.—2003, vol. 2 (7 sheets).
Herbert et al., "A Robotic Gripper System for Limp Material Manipulation: Hardware and Software Development and Integration", Proc. of the 1997 IEEE, Int'l Cont on Robotics and Automation, Apr. 1997 (pp. 15-21).
Cipolla et al., "Vissually Guided Grasping in Unstructured Environments", J. of Robotics and Autonomous Sys. (pp. 1-20).
Klingbeil et al., "Grasping with Application to an Autonomous Checkout Robot", Proc. of IEEE, Intl Conf. on Robotics and Automation, Jun. 2011 (9 sheets).
International Search Report & Written Opinion issued by the International Searching Authority in related International Patent Application No. PCT/US2016/050786 dated Nov. 24, 2016, 11 pgs.
International Preliminary Report on Patentability issued by the International Bureau of WIPO dated Mar. 13, 2018 in related International Application No. PCT/US2016/050786, 7 pages.
Examiner's Report issued by the Canadian Intellectual Property Office on May 16, 2019 in related Canadian Patent Application No. 2,998,403, 3 pages.
Communication pursuant to Rules 161(1) and 162 EPC issued by the European Patent Office dated Apr. 17, 2018 in related European Patent Application No. 16767467.0, 3 pages.

* cited by examiner

SYSTEMS AND METHODS FOR PROVIDING DYNAMIC COMMUNICATIVE LIGHTING IN A ROBOTIC ENVIRONMENT

PRIORITY

The present application claims priority to U.S. patent application Ser. No. 15/259,961 filed Sep. 8, 2016, which claims priority to U.S. Provisional Patent Application Ser. No. 62/216,017 filed Sep. 9, 2015, the entire disclosures of which are hereby incorporated by reference in their entireties.

BACKGROUND

The invention generally relates to robotic systems, and relates in particular, to robotic systems that are used in an environment involving human activity.

Certain robotic systems are intended to be used in environments that also include people. In warehouse sortation environments for example, human workers are responsible for taking objects and placing them onto shelves in correct locations. A common paradigm is to use workcells with put-to-light systems to facilitate this process by indicating via lights the desired target location. These systems typically employ either monochromatic lights or have a display showing the number of items that the worker should place on the shelf. By using these lights as visual cues, valuable time is shaved off of the sortation task. Additionally, workers may have issues sorting particular unexpected, damaged, non-bar-coded or otherwise problematic unsortable items. When workers come across objects such as these, they may raise a small flag or activatable light to indicate to a manager or foreman that they had issues processing an item. This allows them to continue sorting without leaving their work area.

Current solutions such as put-to-light however, do not translate well for use in automated systems. Using lighting to demonstrate to a robot where to place an object may in fact, be fundamentally worse than sending it placement locations directly from a Warehouse Management System or other database. As such, automated systems do not typically use lighting in determining object placement. Further, human workers who work in sortation facilities may have preconceived expectations of the role lighting plays in sortation. There remains a need therefore, for a robotic system that is able to better, quickly and efficiently communicate with human workers in the robotic environment, information that may help to keep each human worker safe from injury.

SUMMARY

In accordance with an embodiment, the invention provides a robotic system including an articulated arm with an end effector. The robotic system is for use in a robotic environment requiring interaction with persons in the robotic environment, and the robotic system includes a plurality of lights that are illuminated responsive to known near-future movements of the articulated arm to convey the known near-future movements of the articulated arm to the persons in the robot environment.

In accordance with another embodiment, the invention provides a robotic system including an articulated arm with an end effector. The robotic system is for use in an environment requiring interaction with persons in the robotic system and includes a plurality of sortation locations and a plurality of lights that are each associated with a sortation location. The system provides that one or more of the plurality of lights is engageable to be illuminated to indicate that the system plans to move the end effector toward a sortation location that is associated with the one or more of the plurality of lights.

In accordance with a further embodiment, the invention provides a method of providing communication lighting in a robotic environment requiring interaction with persons in the robotic environment. The method includes the steps of providing in the robotic environment, a robotic system having an end effector, and providing illumination indicative of a planned direction of movement of the end effector of the robotic system in the robotic environment.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment the invention provides lighting system for use in robotic sortation environment, as well as the use of such a system for conveying system state. In certain embodiments, an array of RGB LEDs is placed on shelves, and an array of RGB LEDs is mounted on an end effector or manipulator. In further embodiments, the invention provides a method of conveying robot state using these systems as well as a light pole.

The invention therefore provides systems and methods for conveying state and near-future information via LED arrays during robotic sortation. In certain embodiments, the invention provides systems and methods for facilitating communication with human workers.

In accordance with various embodiments, the invention provides a robotic system that includes an array of RGB LEDs mounted above or below shelves, and provides in an example, information regarding where the automated system will place future objects, the location of previously placed objects, and general system state. An array of RGB LEDs may be mounted on a manipulator or end effector. The invention also provides for the use of the system in conveying information about the process of picking objects, the qualities of picked objects, the qualities of grasps on objects, and general system state, as well as the use of light poles in conveying automated system state for sortation.

Figure 1:
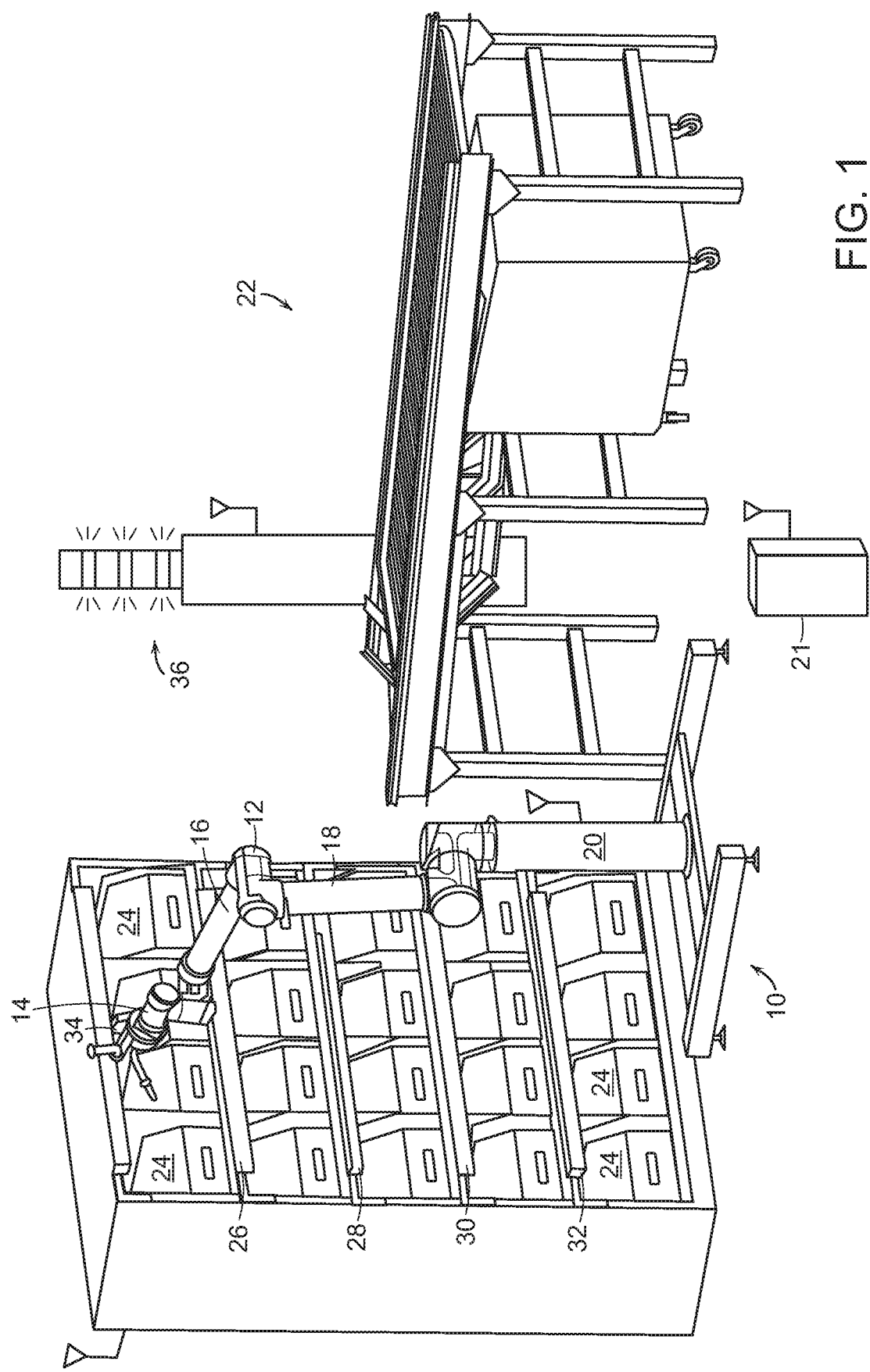
FIG. 1 shows an illustrative diagrammatic view of a robotic system in accordance with an embodiment of the present invention.

FIG. 1, for example, shows a system in accordance with an embodiment of the present invention that includes a robotic system 10 including an articulated arm 12. The articulated arm 12 includes an end effector 14 as well as articulated segments 16, 18 and 20 and is, for example, programmed for picking items from a conveyor 22 and for placing the items in one of several correct bins or sortation locations 24. The robotic system is designed to be employed in an environment that includes human workers that may provide items to the conveyor, remove full bins, provide maintenance of the articulated arms or otherwise perform services that require that they be present in and move around in the robotic environment.

As also shown in FIG. 1, the robotic system may include lighting systems 26, 28, 30 and 32 on shelves that support the bins 24, as well as a lighting system 34 that is located on the end effector 14 for conveying information regarding a state of the end effector, and a lighting system 36 that is indicative of the state of the robot. The robotic system may include a controller in a base of the articulated arm, or may include a remote controller 21 that communicates either wirelessly or by directly wiring to the articulated arm and the robotic environment.

Figure 2:
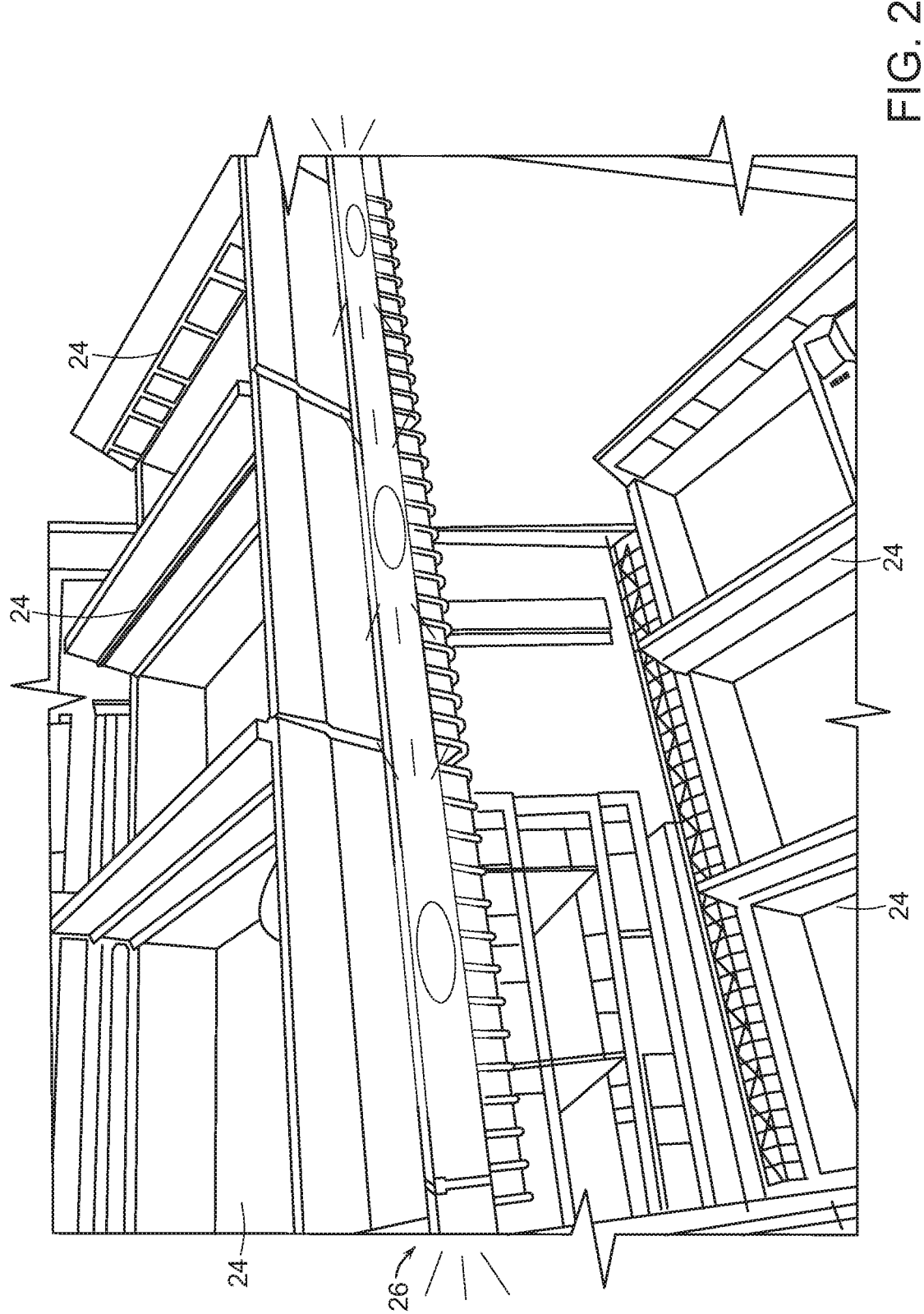
FIG. 2 shows an illustrative diagrammatic view of a destination location portion of the robotic system as shown in FIG. 1.

FIG. 2, for example, shows a lighting system such as any of systems 22, 24, 26 and 28 of FIG. 1 wherein each includes a lighting strip 26 positioned above or below a shelf of bins 24. Each strip of RGB LEDs 26 is mounted on individual shelves and covered with translucent plastic. Controllers are mounted on the side of shelving units. LEDs may be individually controlled through software over a local WiFi network in order to show system state. The lighting strips 26 may be illuminated, for example, in a first color or a first mode (e.g., a first flashing mode) to convey that the system is planning to move the end effector to the associate bin or destination location. Further, the lighting strip may be illuminated in a second color or a second mode (e.g., second flashing mode) to indicate that the associated destination location or bin is full and needs to be removed by a human worker.

In accordance with certain embodiments of the invention therefore, the lighting system may convey the state of the robotic sortation task, as well as the state of the robot. For example, in an embodiment, after the system has selected a place location, a subset of the RGB LEDs 26 adjacent to the place location are illuminated in a pulsing color in order to demonstrate where the robot will place its next object. Once objects are placed, the same LEDs are illuminated in a different color in order to indicate a successful place. Similarly, when performing tasks requiring caution or when an error has occurred, all lights can be placed into a pulsing orange or red color, respectively. Conveying system state in this manner provides human workers with easily accessible and digestible information about the task at hand and allows for advanced collaborative interaction with automated systems.

Figure 3:
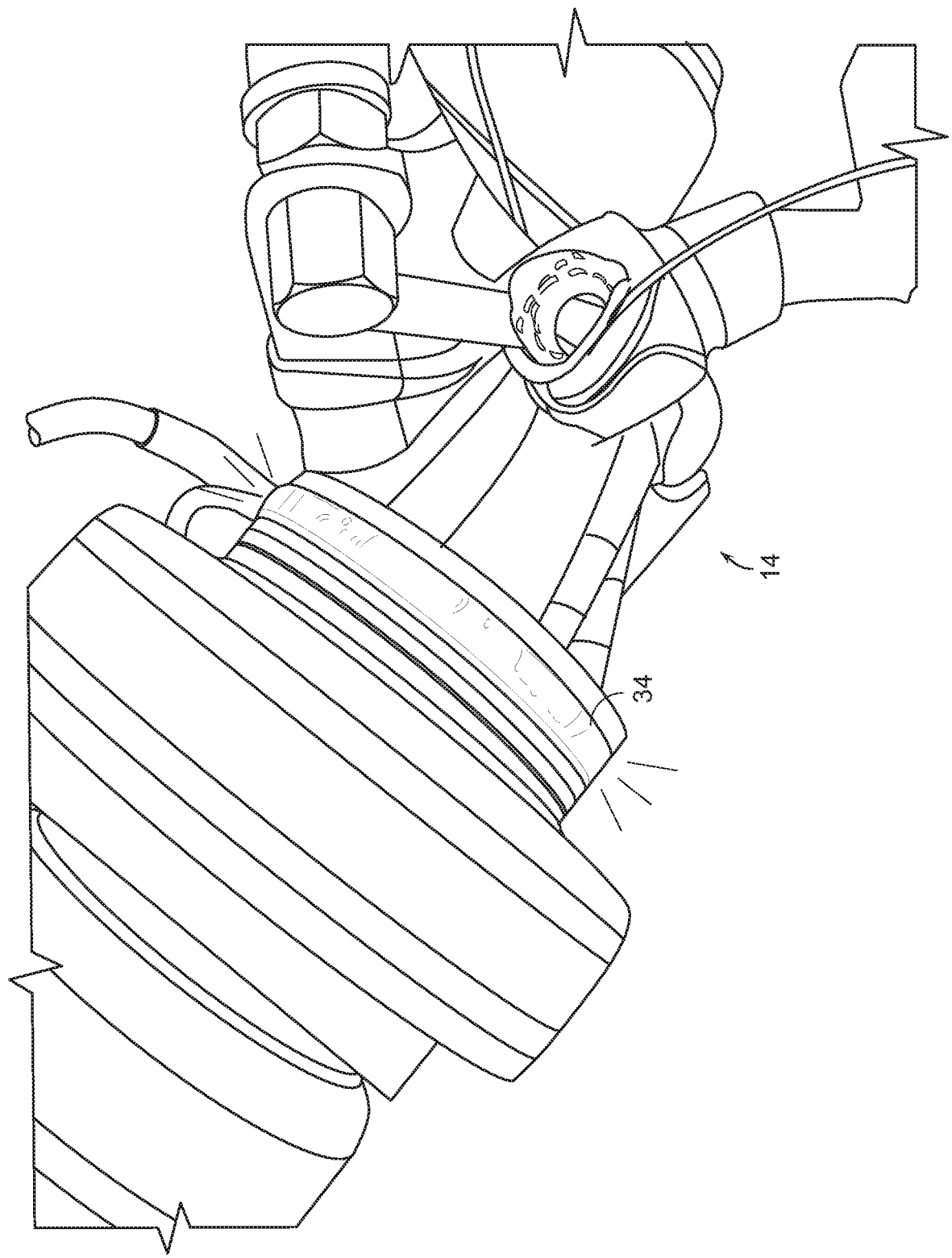
FIG. 3 shows an illustrative diagrammatic view of an end effector portion of the robotic system as shown in FIG. 1.

FIG. 3 shows a lighting system in accordance with an embodiment that includes LEDs 34 that are mounted in a ring on the end effector 14, and are visible through a translucent circular plastic cover. The lights 34 on the end effector 14 are used to convey information about objects about the state of the robot, as well as the state of the system. When objects are picked up, the LEDs 34 are briefly illuminated to indicate a successful grasp, or may show a different color if the item is to be returned to the conveyor 22 due to a compromised grasp, the lights 34 may show a different color and/or flashing illumination. When the robot has entered a different mode, such as movement to a sortation bin, the LEDs 34 are illuminated with different colors. The lights 34 may also be used to show an anticipated direction of movement of the end effector, for example, by having the lights flash green on a side in the direction of which the end effector is about to be moved. Again, the lights 34 may be illuminated with different colors or modes of flashing to communicate robotic state, end effector state, and end effector direction of planned movement.

Figure 4:
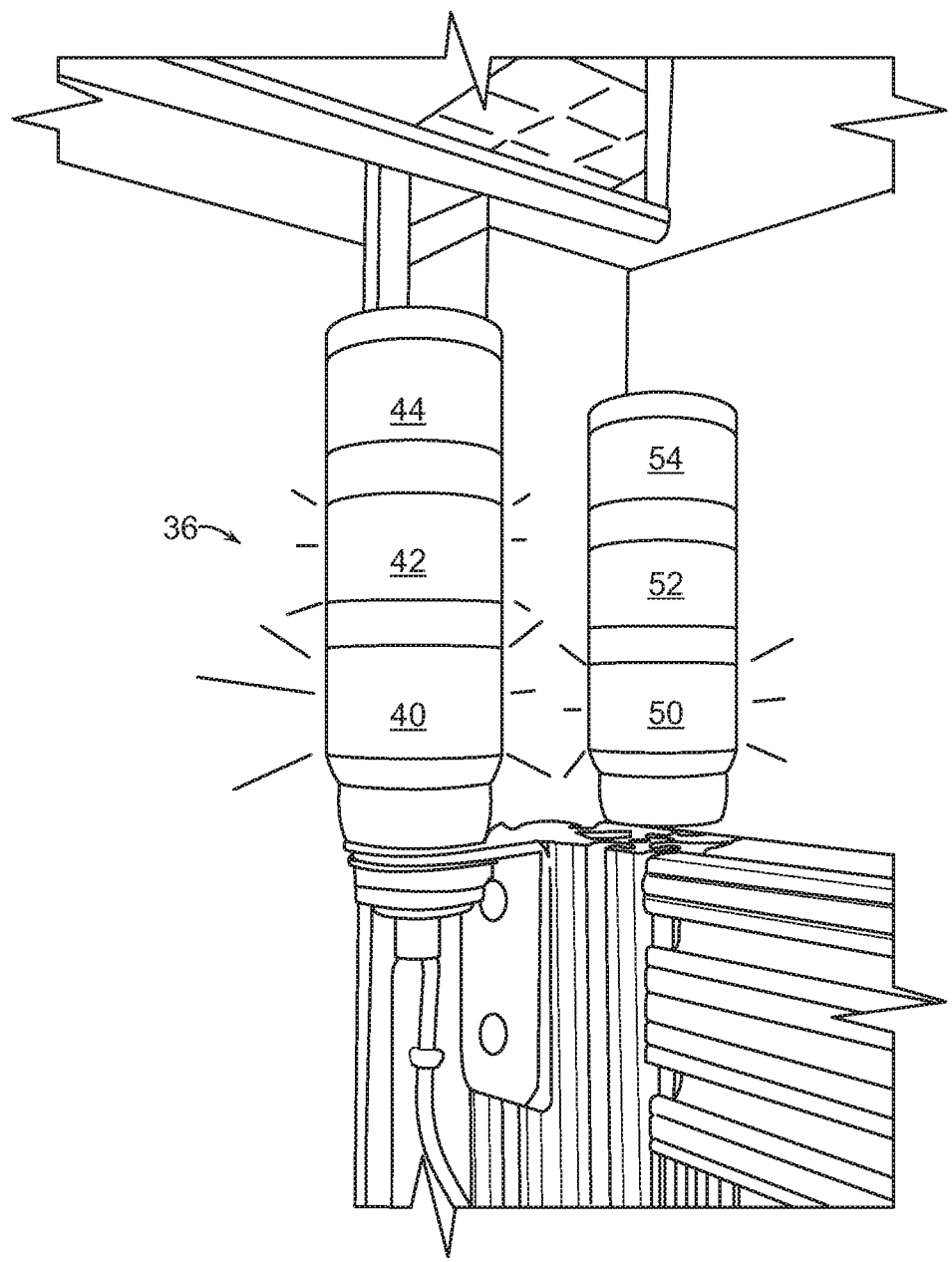
FIG. 4 shows an illustrative diagrammatic view of a plurality of station identification locations of the robotic system of FIG. 1.

FIG. 4 shows an lighting system in accordance with a further embodiment of the invention that includes a lighting system 36, which includes a light pole having individual lights 40, 42 and 44, which are used to indicate system state to human workers who may not be in an immediate area. Typically, this involves illuminating a green light when the system is running and a red light when the system has entered an error state. More complicated states, such as when the system is waiting for additional items to sort, may also be provided. Additional robotic adjacent systems may include other lighting systems including lights 50, 52 and 54. As noted above, the lights 34 may be illuminated with different colors or modes of flashing to communicate robotic state, end effector state, or end effector direction of planned movement.

In accordance with various embodiments, therefore, the plurality of lights may be multi-colored lights proximate to an end effector of the articulated arm. In further embodiments, the plurality of multi-colored lights may be indicative of an intended direction of movement of the end effector, or may be indicative of the end effector grasp quality on an object. In further embodiments, the plurality of multi-colored lights may be provided on a wrist of the end effector, and may be indicative of the robotic system not having proper information regarding a required task for an object, or indicative of the robotic system not recognizing the object. In further embodiments, the plurality of multi-colored lights may be indicative of the robotic system not knowing where to put an object, or may be indicative of where an end effector is being directed. In certain embodiments, the plurality of multi-colored lights include lights at potential target locations that are indicative of when a target location bin is full or otherwise completed.

Those skilled in the art will appreciate that numerous modifications and variations may be made to the above disclosed embodiments without departing from the spirit and scope of the present invention.

What is claimed is:

1. A method of providing communication lighting in a robotic environment requiring interaction with persons in the robotic environment,
    providing in the robotic environment, a robotic system having an end effector and a plurality of lights provided in a ring proximate the end effector;
    engaging the plurality of lights in a first mode to indicate a planned direction of movement of the end effector by illuminating one or more of the plurality of lights that are on a side of the ring that is associated with the planned direction of movement of the end effector;
    engaging the plurality of lights in a second mode to indicate a grasp quality of the end effector's grasp on an object;
    engaging the plurality of lights in a third mode to indicate that the robotic system does not have sufficient information regarding a required task for the object; and
    engaging the plurality of lights in a fourth mode to indicate that the robotic system does not recognize the object.

2. The method as claimed in claim 1, wherein engaging the plurality of lights in the first mode to indicate the planned direction of movement of the end effector further includes illuminating at least one target light associated with a planned destination location.

3. The method as claimed in claim 2, wherein illuminating at least one target light includes illuminating at least one multi-colored light.

4. The method as claimed in claim 2, wherein illuminating at least one target light includes illuminating at least one flashing light.

5. The method as claimed in claim 1, wherein engaging the plurality of lights in one or more of the second mode, the third mode, and the fourth mode includes engaging flashing lights.

6. The method as claimed in claim 1, wherein engaging the plurality of lights in one or more of the second mode, the third mode, and the fourth mode includes engaging multi-colored lights.

7. A robotic system including an articulated arm with an end effector, said robotic system comprising a plurality of lights provided in a ring proximate the end effector,
 said plurality of lights being engageable in a first mode to indicate a planned direction of movement of the end effector by illuminating one or more of the plurality of lights that are on a side of the ring that is associated with the planned direction of movement of the end effector,
 the plurality of lights being engageable in a second mode to indicate a grasp quality of the end effector's grasp on an object,
 the plurality of lights being further engageable in a third mode to indicate that the robotic system does not have sufficient information regarding a required task for the object, and
 the plurality of lights being further engageable in a fourth mode to indicate that the robotic system does not recognize the object.

8. The robotic system as claimed in claim 7, wherein the robotic system further includes a plurality of target lights, each of which is provided at a planned target location and is indicative of whether the robotic system is programmed to place the object at the planned target location.

9. The robotic system as claimed in claim 8, wherein the target lights are provided as flashing lights.

10. The robotic system as claimed in claim 8, wherein the target lights are provided as multi-colored lights.

11. The robotic system as claimed in claim 8, wherein the target lights are indicative of when the associated target location is full or otherwise completed.

12. A robotic system including an articulated arm with an end effector, said robotic system comprising a plurality of lights provided in a ring proximate the end effector,
 said plurality of lights being engageable in a first mode to indicate a planned direction of movement of the end effector by illuminating one or more of the plurality of lights that are on a side of the ring that is associated with the planned direction of movement of the end effector,
 said plurality of lights being engageable in a second mode to indicate that the robotic system does not have sufficient information regarding a required task for an object grasped by the end effector, and
 the plurality of lights being further engageable in a third mode to indicate a grasp quality of the end effector's grasp on the object.

13. The robotic system as claimed in claim 12, wherein the plurality of lights are further engageable in a fourth mode to indicate that the robotic system does not recognize the object.

14. The robotic system as claimed in claim 12, wherein the robotic system further includes a plurality of target lights, each of which is provided at a planned target location and is indicative of whether the robotic system is programmed to place the object at the planned target location.

15. The robotic system as claimed in claim 14, wherein the plurality of target lights are provided as flashing lights.

16. The robotic system as claimed in claim 14, wherein the plurality of target lights are provided as multi-colored lights.

17. The robotic system as claimed in claim 14, wherein the plurality of target lights are indicative of when an associated target location is full or otherwise completed.

* * * * *

UNITED STATES PATENT AND TRADEMARK OFFICE
CERTIFICATE OF CORRECTION

PATENT NO. : 10,632,631 B2
APPLICATION NO. : 16/243753
DATED : April 28, 2020
INVENTOR(S) : Thomas Wagner et al.

It is certified that error appears in the above-identified patent and that said Letters Patent is hereby corrected as shown below:

On the Title Page

Item (63), Related U.S. Application Data should read:
"Continuation of application No. 15/259,961, filed on Sep. 8, 2016, now Pat. No. 10,265,872, which claims"

Page 2, Item (63), Related U.S. Application Data should read:
"priority to Provisional application No. 62/216,017, filed on Sep. 9, 2015."

Signed and Sealed this
Ninth Day of June, 2020

Andrei Iancu
*Director of the United States Patent and Trademark Office*